(12) United States Patent
Mirshafieyan et al.

(10) Patent No.: US 11,106,063 B1
(45) Date of Patent: Aug. 31, 2021

(54) ELECTRICALLY-TUNABLE OPTICAL FILTERS AND METHODS

(71) Applicants: Seyed Sadreddin Mirshafieyan, Huntsville, AL (US); Don Allen Gregory, Huntsville, AL (US)

(72) Inventors: Seyed Sadreddin Mirshafieyan, Huntsville, AL (US); Don Allen Gregory, Huntsville, AL (US)

(73) Assignee: Board of Trustees of the University of Alabama, for and on behalf of the University of Alabama in Huntsville, Huntsville, AL (US)

( * ) Notice: Subject to any disclaimer, the term of this patent is extended or adjusted under 35 U.S.C. 154(b) by 57 days.

(21) Appl. No.: 16/271,424

(22) Filed: Feb. 8, 2019

(51) Int. Cl.
*G02F 1/03* (2006.01)

(52) U.S. Cl.
CPC .......... *G02F 1/0327* (2013.01); *G02F 1/0311* (2013.01)

(58) Field of Classification Search
CPC . G02F 1/03; G02F 1/07; G02F 1/0327; G02F 1/0311; G02F 1/0126; G02F 1/155; G02F 1/163; G02B 1/10; G02B 1/01; G02B 5/28; G02B 5/23; G02B 5/008
USPC ....... 359/278, 240, 241, 321, 586, 578, 580, 359/588, 589, 855
See application file for complete search history.

(56) References Cited

U.S. PATENT DOCUMENTS

| | | | |
|---|---|---|---|
| 10,162,091 B1 | 12/2018 | Guo et al. | |
| 2003/0081319 A1* | 5/2003 | Hsu | G02B 5/288 359/579 |
| 2005/0013000 A1* | 1/2005 | Uehara | G02F 1/0305 359/586 |

OTHER PUBLICATIONS

Kumar, et al., "Printing Color at the Optical Diffraction Limit," Nature Technology, Sep. 2012, pp. 557-561, vol. 7.
Flauraud, et al., "Silicon Nanostructures for Bright Field Full Color Prints," ACS Publication, 2017, pp. 1913-1919, vol. 4.

* cited by examiner

*Primary Examiner* — Jie Lei
(74) *Attorney, Agent, or Firm* — Maynard Cooper & Gale, P. C.; Jon E. Holland (57) ABSTRACT

An electrically-tunable optical filter has an optical cavity that forms an absorption peak in light that is incident on the filter. The optical cavity includes a layer composed of a material with a high electro-optic coefficient so that the index of refraction of the layer changes in response to a voltage applied by a controller. By adjusting the voltage, the controller can control the index of refraction so that an absorption peak of the filter can be tuned as may be desired without having to alter the physical structure of the filter.

10 Claims, 10 Drawing Sheets

ELECTRICALLY-TUNABLE OPTICAL FILTERS AND METHODS

RELATED ART

Thin-film optical filters, such as those based on Fabry-Perot nanocavities and nanostructure patterning, have recently garnered significant attention in their ability to absorb various wavelengths of light because of their straightforward fabrication, low cost, and wide range of potential applications. The absorption wavelength is typically controlled by tailoring the thickness of the nanocavity and by nanostructure patterning, thereby making it problematic to dynamically change the absorption wavelength in a reliable and efficient manner. Some optical filters use liquid crystal to change the optical properties of light reflected from or otherwise emitted by the filter. The use of liquid crystal increases the complexity and cost of the filter, and the structural configuration of filters using liquid crystal generally limits resolution and speed. Improved optical filters capable of easily and reliably tuning the absorption wavelength are generally desired.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure generally pertains to electrically-tunable optical filters and methods. An optical filter in accordance with one embodiment of the present disclosure has a dielectric layer that is formed on a conductive substrate along with a layer, referred to herein as a "variable index of refraction" or "VIR" layer, of material having a relatively high electro-optic coefficient such that the carrier density within the VIR layer can be significantly increased in response to an electric field. The dielectric layer and the VIR layer are between the conductive substrate and another conductive layer. The layers of the optical filter form an optical cavity that absorbs light. Specifically, the cavity achieves near perfect absorption at a wavelength, referred to herein as "absorption wavelength," that induces resonance within the cavity, thereby forming an absorption peak within the light at such wavelength.

The conductive layers are coupled to a controller that is configured to apply a voltage to the conductive layers, thereby generating an electric field that passes through the VIR layer. By changing the voltage and hence magnitude of the electric field, the controller can adjust the carrier density within the VIR layer, thereby changing the index of refraction of this layer. Such change in the index of refraction causes a shift in the absorption wavelength. Thus, by controlling the voltage applied to the conductive layers, the controller can tune the absorption wavelength to change the color of light reflected from or otherwise emitted by the light absorber.

Figure 1:
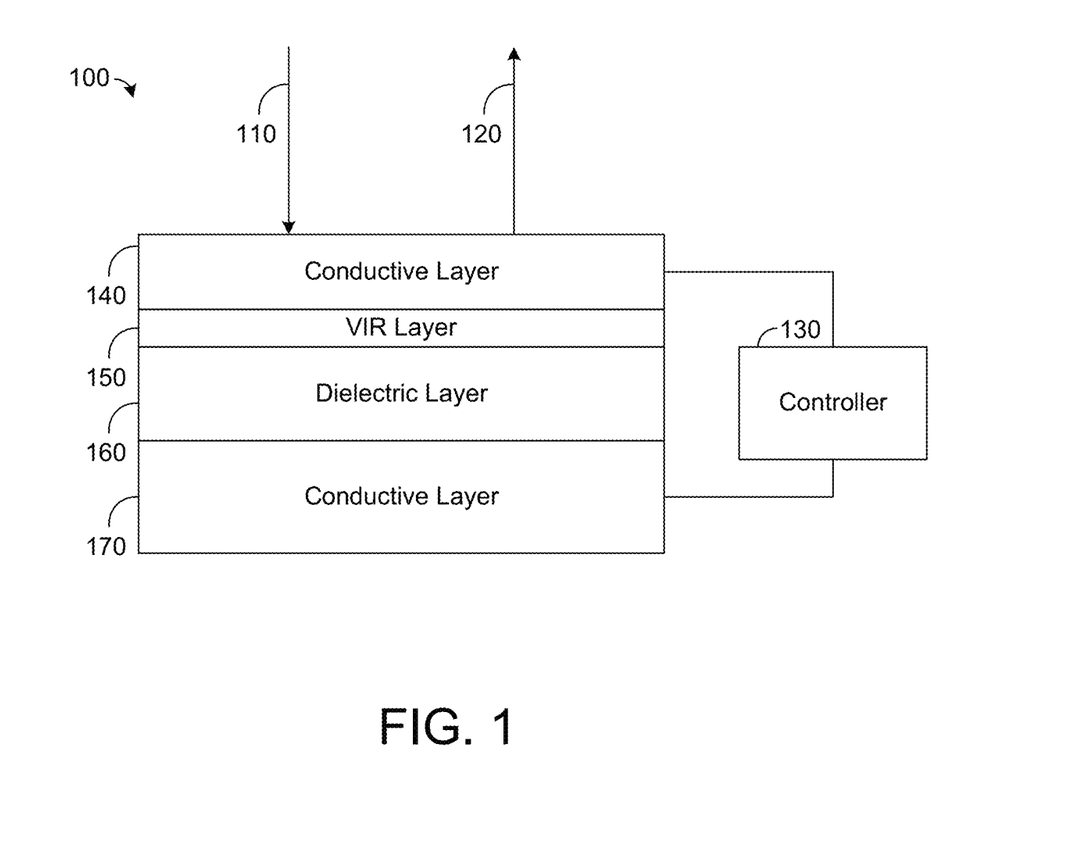
FIG. 1 depicts an exemplary embodiment of an electrically-tunable optical filter with near perfect light absorption at a specific wavelength.

FIG. 1 depicts an exemplary embodiment of a tunable optical filter 100. The exemplary filter 100 shown by FIG. 1 has four layers: a conductive layer 170, a dielectric layer 160, a VIR layer 150, and a conductive layer 140, although the filter 100 may have other layers in other embodiments. The layers 140, 150, 160, 170 form an optical cavity that receives light 110 from a light source (not specifically shown). The light 110 has a spectrum spanning across a wavelength range. As an example, the light 110 may be white light, but other types of light with narrower wavelength ranges are possible.

As shown by FIG. 1, the conductive layers 170, 140 are electrically coupled to a controller 130 that is configured to apply a voltage to the conductive layers 170, 140, thereby generating an electric field that passes through the optical cavity, including the VIR layer 150. In one embodiment, the conductive layers 170, 140 are composed of silver, but other conductive materials, such as gold, aluminum, copper, and other metals may be used.

The conductive layer 170 may form a substrate on which the other layers of the filter 100 may be formed. The conductive layer 140 is sufficiently thin (e.g., about 40 nanometers (nm) or less) so that it is at least semi-transparent. That is, at a least a portion of the light 110 incident on the surface of the layer 140 passes into the optical cavity. In one embodiment, the conductive layer 170 is sufficiently thick so that it is opaque and completely reflects the light within the cavity. Thus, light 110 in the cavity reflects back and forth between the layers 170, 140 with some of the light escaping through the conductive layer 140 to form reflected light 120. In other embodiments, the conductive layer 170 may be sufficiently thin (e.g., about 40 nm or less) so that it is semi-transparent. In such an embodiment, a portion of the light in the cavity escapes through the conductive layer 170, similar to the light 120 escaping through the conductive layer 140 described above.

While the light 110 is reflecting back and forth in the cavity, the light 110 is affected by constructive and destructive interference within the cavity. Light 110 at a certain wavelength, referred to as the "absorption wavelength," resonates within the cavity causing greater interference of the light within the cavity. In this regard, near perfect absorption of the light at the absorption wavelength occurs in the cavity, thereby forming an absorption peak in the light 110. Thus, the light 120 emitted from the filter 100 has an absorption peak at the absorption wavelength, thereby affecting the color of the light 120 seen by a viewer.

Note that the structure of the filter 100 affects the absorption wavelength. Specifically, the absorption wavelength is based on the thickness of the cavity and the index of refraction of each layer within the cavity. Thus, changing the thickness or index of refraction of any layer within the cavity has the effect of changing the absorption wavelength. That is, the absorption wavelength can be tuned to a specific wavelength by controlling the index of refraction or thickness of one or more layers.

The VIR layer 150 has an index of refraction that varies based on the voltage applied across the conductive layers 170, 140 by the controller 130. In this regard, the VIR layer 150 is composed of a material having a high electro-optic coefficient so that the carrier density within the material significantly changes in response to a change in the voltage applied by the controller 130. As an example, in response to an increase in voltage from the controller 130, the carrier density within the VIR layer 150 may be increased so that the VIR layer 150 becomes more conductive, similar to a metal. Conversely, in response to a decrease in voltage from the controller 130, the carrier density within the VIR layer 150 may become less conductive. Changing the electrical conductivity of the VIR layer 150 has the effect of changing the index of refraction of the VIR layer 150 and, hence, the optical characteristics of the cavity. In this regard, a change in the voltage applied by the controller 130 to the conductive layers 170, 140 shifts the absorption peak in the light 120 emitted by the filter 100. That is, a change in the voltage tunes the absorption wavelength to a new wavelength so that the absorption peak is shifted, thereby changing the color of the light 120 emitted from the filter 100.

There are various types of materials that may be used for the VIR layer 150. In one embodiment, the VIR layer 150 is composed of n-typed doped indium antimonide (n-InSb), but other types of materials, such as undoped InSb or other materials having a relatively high electro-optic coefficient may be used. In addition, in one embodiment, the dielectric layer 160 is composed of titanium oxide ($TiO_2$), but other types of dielectric material may be used in other embodiments.

The controller 130 may be implemented by any device capable of providing and changing a voltage to the conductive layers 170, 140. In one embodiment, the controller 130 comprises at least one processor, such as digital signal processor (DSP) or central processing unit (CPU), that is configured to receive an input indicative of a desired color for the light 120 emitted by the filter 100 and to then adjust the voltage applied to the conductive layers 170, 140 so that the absorption wavelength is appropriately tuned to provide the desired color. In some embodiments, the controller 130 may include software or firmware that runs on at least one processor for performing the functions of the controller 130. In other embodiments, the controller 130 may be implemented solely in hardware, such as a field programmable gate array (FPGA), for performing the functions of the controller 130. In other embodiments, other types of controllers 130, including various combinations of hardware, software, and firmware, may be used.

Figure 2A:
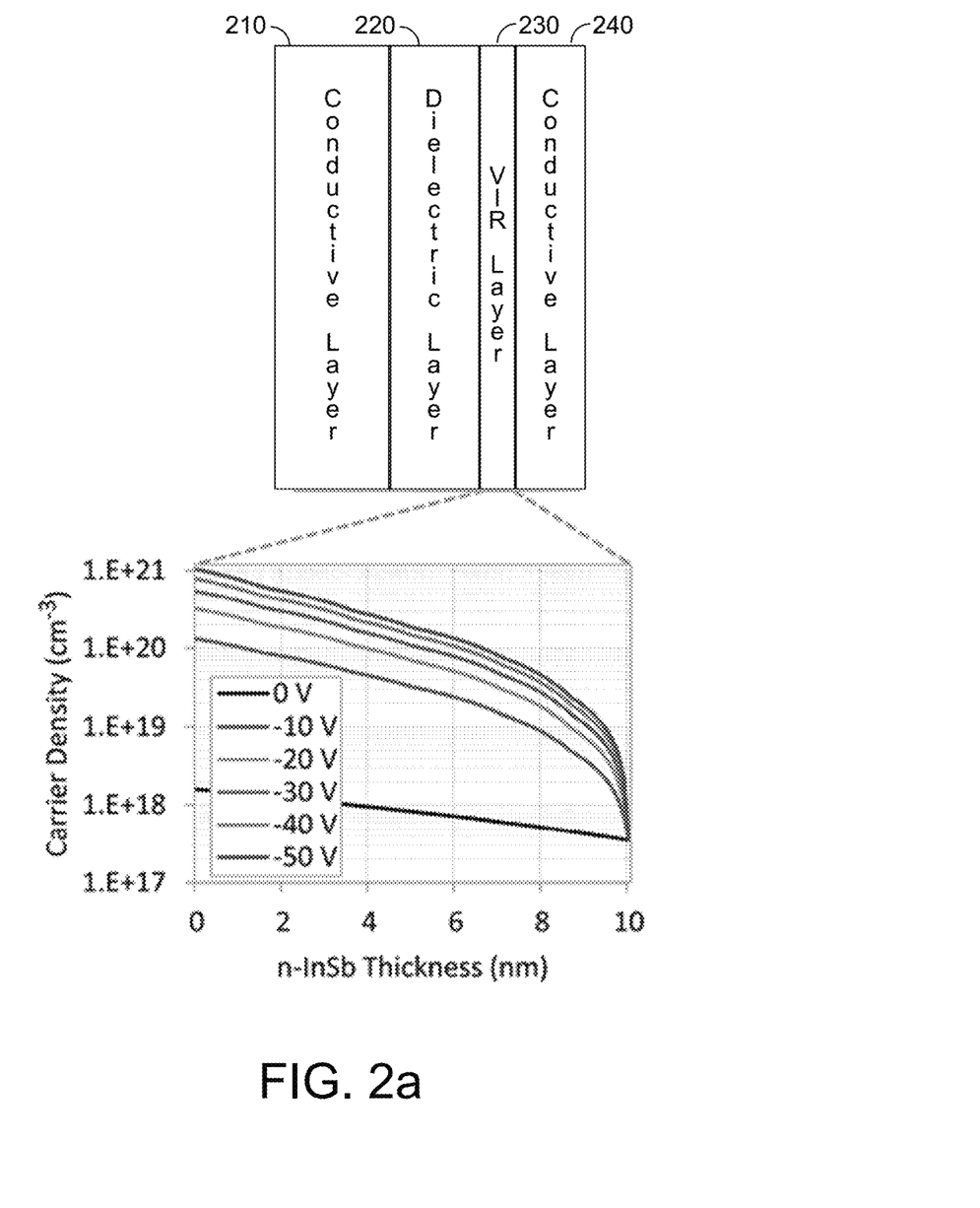
FIGS. 2a and 2b depict graphs illustrating exemplary modulations of carrier densities inside n-InSb films of (a) 10 nm and (b) 20 nm thickness with the application of bias voltage.
Figure 2B:
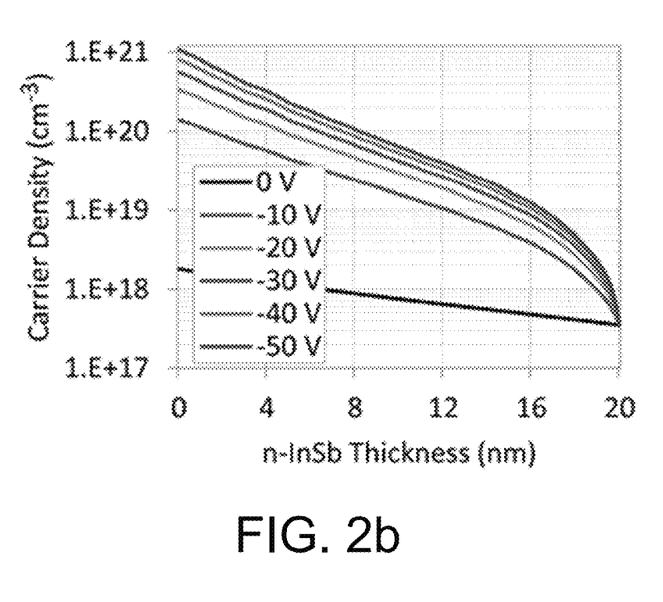
Figure 3A:
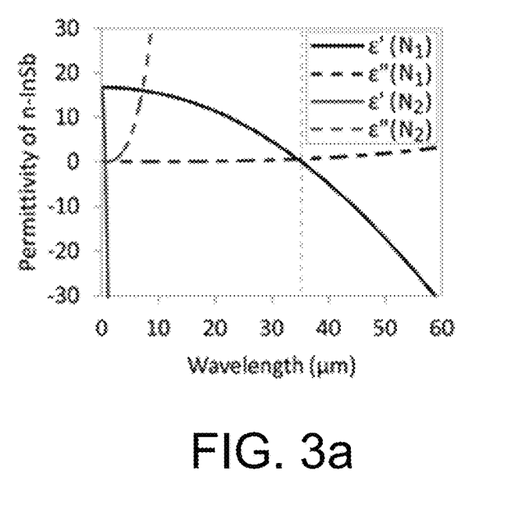
FIGS. 3a-d depict graphs illustrating a permittivity (FIGS. 3a and 3b) and reflectivity (FIGS. 3c and 3d) of n-InSb for different carrier densities in the infrared (FIGS. 3a and 3c) and visible (FIGS. 3b and 3d) light regimes according to the Drude model for $N_1 = 3.5 \times 10^{17}$ cm$^{-3}$ and $N_2 = 3.5 \times 10^{21}$ cm$^{-3}$.
Figure 3B:
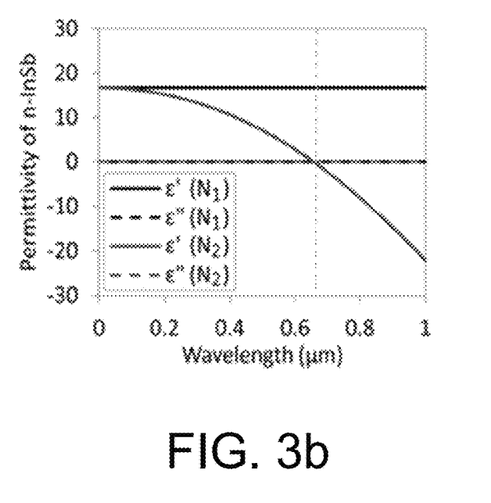
Figure 3C:
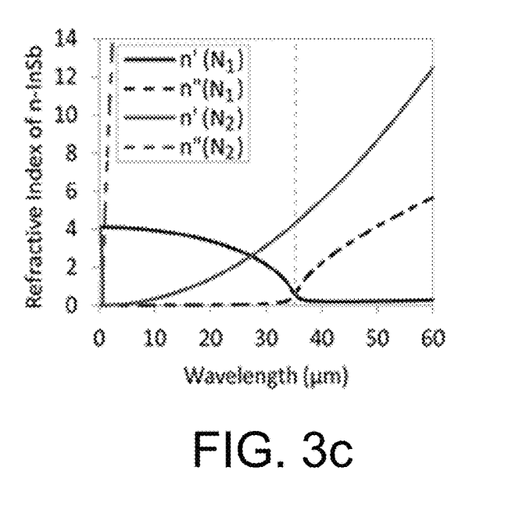
Figure 3D:
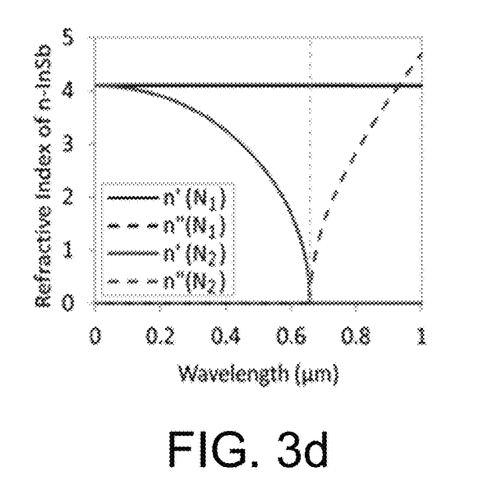
Figure 4A:
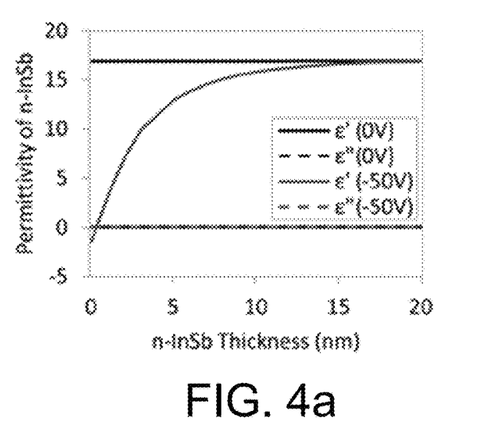
FIGS. 4a and 4b depict graphs illustrating a permittivity and refractive index inside the n-InSb layer at the absorber resonance wavelength of 665 nm due to the application of bias voltage.
Figure 4B:
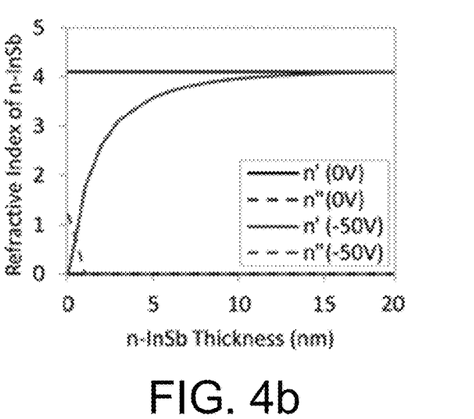

As stated above, the thickness and index of refraction of the layers forming the cavity control the absorption wavelength and, thus, location of the absorption peak within the spectrum emitted by the filter 100. By applying a voltage across the conductive layers 170, 140, the electron carrier density and, thus, index of refraction of the VIR layer 150 changes. FIGS. 2a and 2b shows an exemplary distribution of electron carrier density for n-InSb thicknesses of 10 nanometers (nm) and 20 nm respectively. n-InSb has a carrier density of $N=3.5\times10^{17}$ $cm^{-3}$ when there is no voltage applied across the VIR layer 150 by the controller 130, and the carrier density increases to $N=10^{21}$ $cm^{-3}$ when −50 V is applied across the VIR layer 150 by the controller 130, thereby causing the n-InSb to behave like a metal.

The configuration shown by FIG. 1 has several advantages relative to other approaches for tuning the absorption peak of the filter 100. In this regard, the absorption wavelength of the filter 100 and, hence, the absorption peak in the spectrum emitted from the filter 100 can be tuned without changing the physical structure of the filter 100. Specifically, by adjusting the voltage applied to the conductive layers 170, 140, the absorption peak can be tuned even though the physical thickness of the cavity is not changed. The complexity and cost of manufacturing the filter 100 is relatively low. In addition, the design does not suffer significantly from parallax, and hence has a large effective viewing area. Relative to various other approaches, such as those that rely on liquid crystal, the filter 100 can be used in a display to provide better resolution and speed (e.g., refresh rate). Various other benefits and advantages would be apparent to a person of ordinary skill upon reading this disclosure.

Figure 5A:
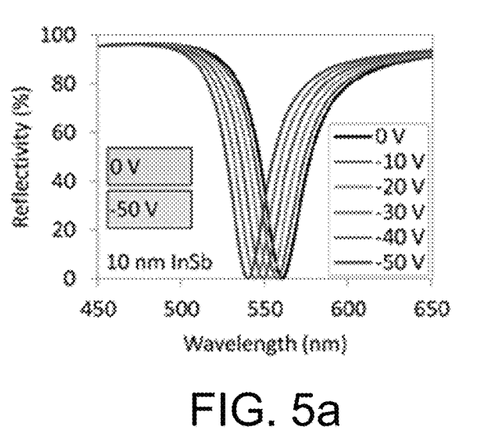
FIGS. 5a and b depicts graphs illustrating a calculated reflectance of two electrically-tunable light absorbers with an n-InSb thicknesses of 10 nm in FIG. 5a, and 20 nm in FIG. 5b.
Figure 5B:
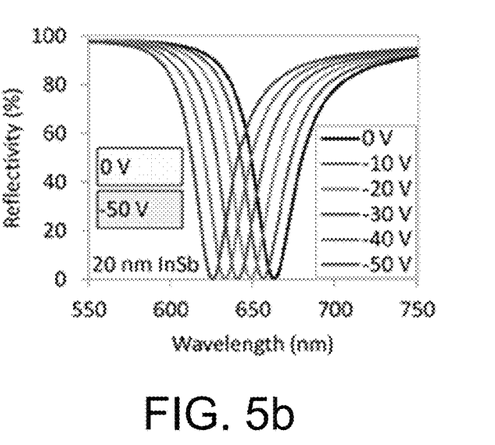

FIGS. 5a and 5b show the calculated reflectivity of two tunable filters in the visual spectrum. For the tunable filter 100 corresponding to FIG. 5a, the conductive layer 140 is composed of silver and has a thickness of about 35 nm, the VIR layer 150 is composed n-InSb and has a thickness of about 10 nm, the dielectric layer 160 is composed of $TiO_2$ and has a thickness of about 40 nm, and the conductive layer 170 is composed of silver and has a thickness of about 100 nm. The tunable filter 100 corresponding to FIG. 5b is the same except the VIR layer 150 has a thickness of about 20 nm instead of about 10 nm.

Figure 6:
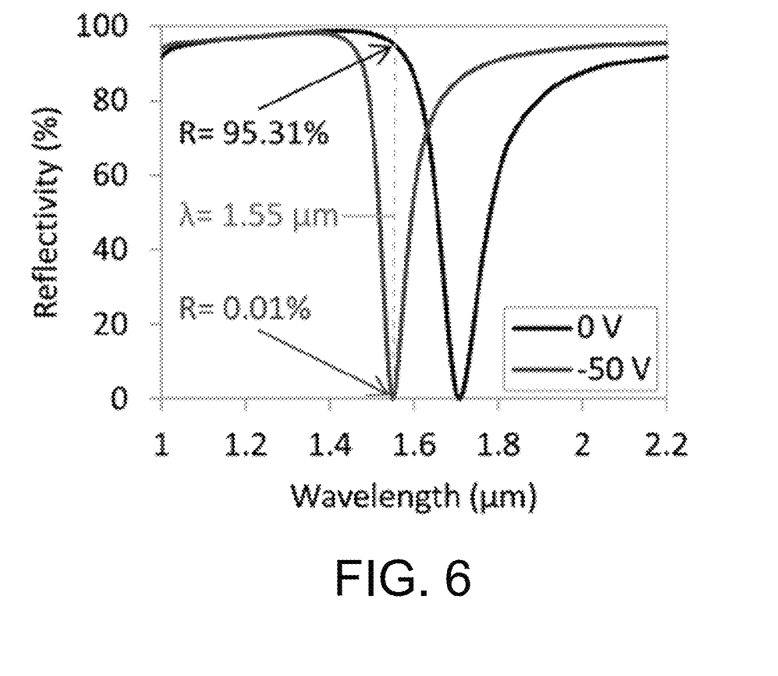
FIG. 6 depicts a graph illustrating a calculated reflectivity of an electrically-tunable light filter in accordance with an exemplary embodiment of the present disclosure.

FIG. 6 shows the calculated reflectivity of a tunable filter composed of Ag/n-InSb/TiO2/Ag structure with corresponding thickness of about 18 nm/40 nm/215 nm/100 nm respectively. This sized cavity shifts the peak absorption wavelength from about 1710 nm to about 1550 nm when a −50 V voltage is applied. As can be seen, absorption is near complete with reflectivity at about 0.01% and the absorption at 99.99% for the peak absorption wavelength. When the applied voltage is reduced to 0 V, peak absorption shifts toward the red peaking at about 1710 nm and reflectivity of the structure increases to 95.3% where the absorption is only 4.69%. In other embodiments, other wavelength shifts and wavelength peaks are possible.

Figure 8:
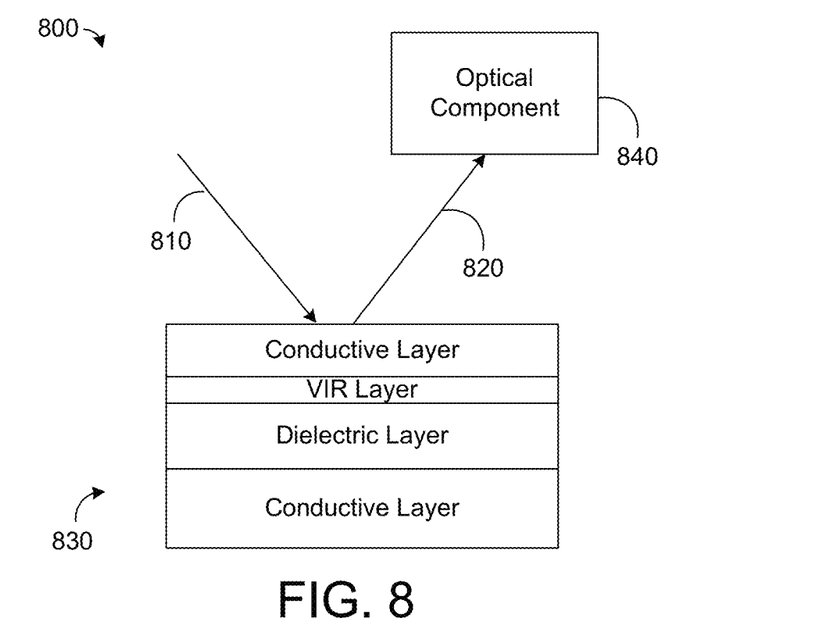
FIG. 8 depicts an exemplary embodiment of a reflective filter.

FIG. 8 illustrates a reflective filter 800 in accordance with an embodiment of the present disclosure. Source light 810 having a spectrum spanning across a range of wavelengths enters the filter 830, which may be configured as shown by FIG. 1. In the embodiment of FIG. 8, the conductive layer 170 is sufficiently thick to be opaque such that light is completely reflected by the conductive layer 170. The light 810 is reflected and filtered by the filter 830, as described above for the embodiment shown by FIG. 1, and the light is emitted from the filter 830 as filtered light 820, which has at least one absorption peak centered on the absorption wavelength of the filter's cavity. The filtered light 820 may be received, viewed or captured by an optical component 840, such as one or more sensors, detectors, or cameras, for further processing as may be desired. The filtered light 820 may also be viewed by a user, such as when the filter 800 is used to form a cell or pixel of a display device.

Figure 9:
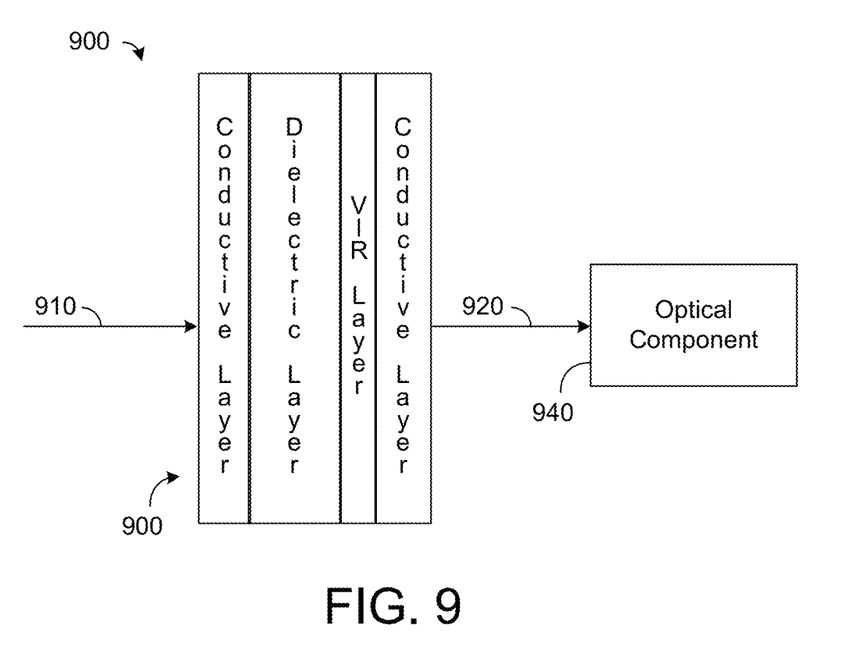
FIG. 9 depicts an exemplary embodiment of a translucent filter.

FIG. 9 illustrates a translucent filter 900 in accordance with an embodiment of the present disclosure. The filter 900 shown by FIG. 9 is similar to the filter 800 shown by FIG. 8 except that the conductive layer 170 of filter 900 is sufficiently thin to be semi-transparent. Thus, the light 910 passes through the filter 900 and is emitted from an opposite side of the filter 900. The filter 900 absorbs light at the absorption wavelength such that the filtered light 920 emitted from the filter 900 has an absorption peak centered on the absorption wavelength of the filter's cavity. The filtered light 920 may be received, viewed or captured by an optical component 940, such as one or more sensors, detectors, or cameras, for further processing as may be desired. The filtered light 920 may also be viewed by a user, such as when the filter 800 is used to form a cell or pixel of a display device.

Figure 10:
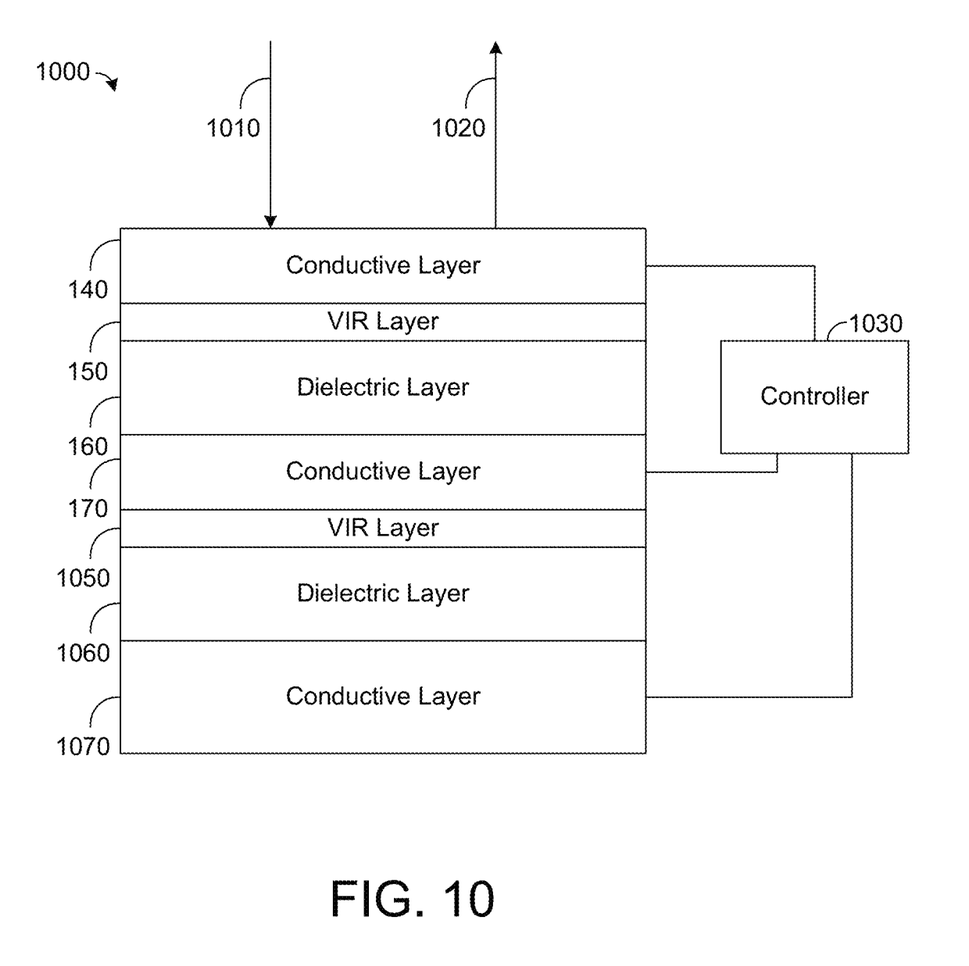
FIG. 10 depicts an exemplary embodiment of an electrically-tunable optical filter.

FIG. 10 shows a tunable filter 1000 in accordance with an exemplary embodiment of the present disclosure. The filter 1000 is similar to the embodiment shown by FIG. 1, except that the filter 1000 has two stacked cavities where each cavity forms a respective absorption peak centered on a different absorption wavelength. In this regard, as described above for the filter 100 of FIG. 1, the filter 1000 has layers 140, 150, 160, 170 that form a first cavity, referred to hereafter as "upper cavity," for absorbing light to form an absorption peak at a first absorption wavelength, as described above. In addition, the filter has a VIR layer 1150, a dielectric layer 1060, and a conductive layer 1070. The layers 170, 1050, 1060, 1070 form a second cavity, referred to hereafter as "lower cavity," that filters light as described above for the upper cavity formed by layers 140, 150, 160, 170. However, controller 130 may apply a different voltage across conductive layers 1070, 170 relative to the voltage applied across conductive layers 140, 170. Thus, the indices of refraction of VIR layers 150 and 1150 may be different such that a different wavelength is absorbed by the lower cavity relative to the upper cavity.

In the embodiment shown by FIG. 10, the conductive layer 170 is preferably sufficiently thin so that it is semi-transparent, thereby allowing the light to reach the lower cavity formed by layers 170, 1050, 1060, 1070. The conductive layer 1070 may be either semi-transparent or opaque depending on whether the filter 1000 is to be reflective or translucent.

The embodiment of FIG. 10 shows two stacked cavities but the filter 1000 may have any number of stacked cavities in other embodiments. Providing more cavities generally enables a greater degree of fine tuning of the wavelength range or ranges emitted from the filter 1000. As an example, several cavities may be used to absorb different wavelength ranges so that the filter 1000 emits a narrow range or multiple discrete ranges of wavelengths. Thus, the controller 130 has more precise control of the wavelengths emitted from the filter 1000 and thus the color of the emitted light.

As described above, n-InSb may be used for the VIR layers described herein. In other embodiments other types of materials may be selected for one or more VIR layers. For example, in other embodiments, an epsilon-near-zero material, such as indium tin oxide (ITO), could be used. In some embodiments, the selected material has permittivity near zero in the target spectrum. The thickness of the cavity and the carrier density may be adjusted for suitable frequencies. The ability of ENZ materials to form carrier depletion and accumulation regions in response to applying of negative voltage to the layer allow it to significantly change their permittivity and refractive index. According to the classic Drude model $$\varepsilon = \varepsilon' - j\varepsilon'', \varepsilon' = \varepsilon_\infty - \frac{\omega_p^2}{\omega^2 + \gamma^2}, \varepsilon'' = \frac{\gamma \omega_p^2}{\omega(\omega^2 + \gamma^2)}, \quad (1)$$

$$\omega_p = \sqrt{\frac{Ne^2}{m*\varepsilon_0}}, \omega_{ENZ} = \sqrt{\frac{\omega_p^2 - \varepsilon_\infty \gamma^2}{\varepsilon_\infty}}, \quad (2)$$

$$n = n' - jn'', n = \sqrt{\varepsilon}, \quad (3)$$

where ε' is the real part and ε" is the imaginary part of the complex permittivity ε. $\varepsilon^\infty$ is the permittivity at high frequencies, ω=2πc/λ, γ is the scattering constant, ωp is the plasma frequency, and $\omega_{ENZ}$ is the ENZ frequency when ε'=0. In equation (2), N is the carrier density, e is the electron charge, m* is electron effective mass, and co is the permittivity of vacuum. In equation (3), n is the complex refractive index of the ENZ material with a real part of n' and an imaginary part of n". This said n-InSb is a particularly good due to its low electron effective mass of 0.023 $m_e$ and low electron carrier density of N~$10^{17}$ cm$^{-3}$ among ENZ materials. Basically, it is desirable for the VIR layer to have an electron carrier density (with no voltage applied) to be between that of the metal and the dielectric. Thus, changing the voltage across the cavity will cause a change in the VIR layer's electron carrier density (and associated index of refraction) making it more like the metal or more like the dielectric. In place of TiO$_2$ any dielectric insulator with a high dielectric constant would suffice.

The electrically-tunable filters described herein may be used in a variety of applications. As an example, a tunable filter may be used to form a pixel of a display. Using embodiments of tunable filters described herein as pixels of a display allows for high-speed color-changing pixels of various size. In other embodiments, the tunable filters described herein may be used as programmable lenses or mirrors for digital cameras allowing the user or camera to for example adjust the filtering spectrum electronically in response to user input other otherwise without the user needing to swap out the lens. A tunable filter, as described herein may also be used as a modulator or switch for telecommunication applications, as will be described in more detail hereafter.

Figure 7:
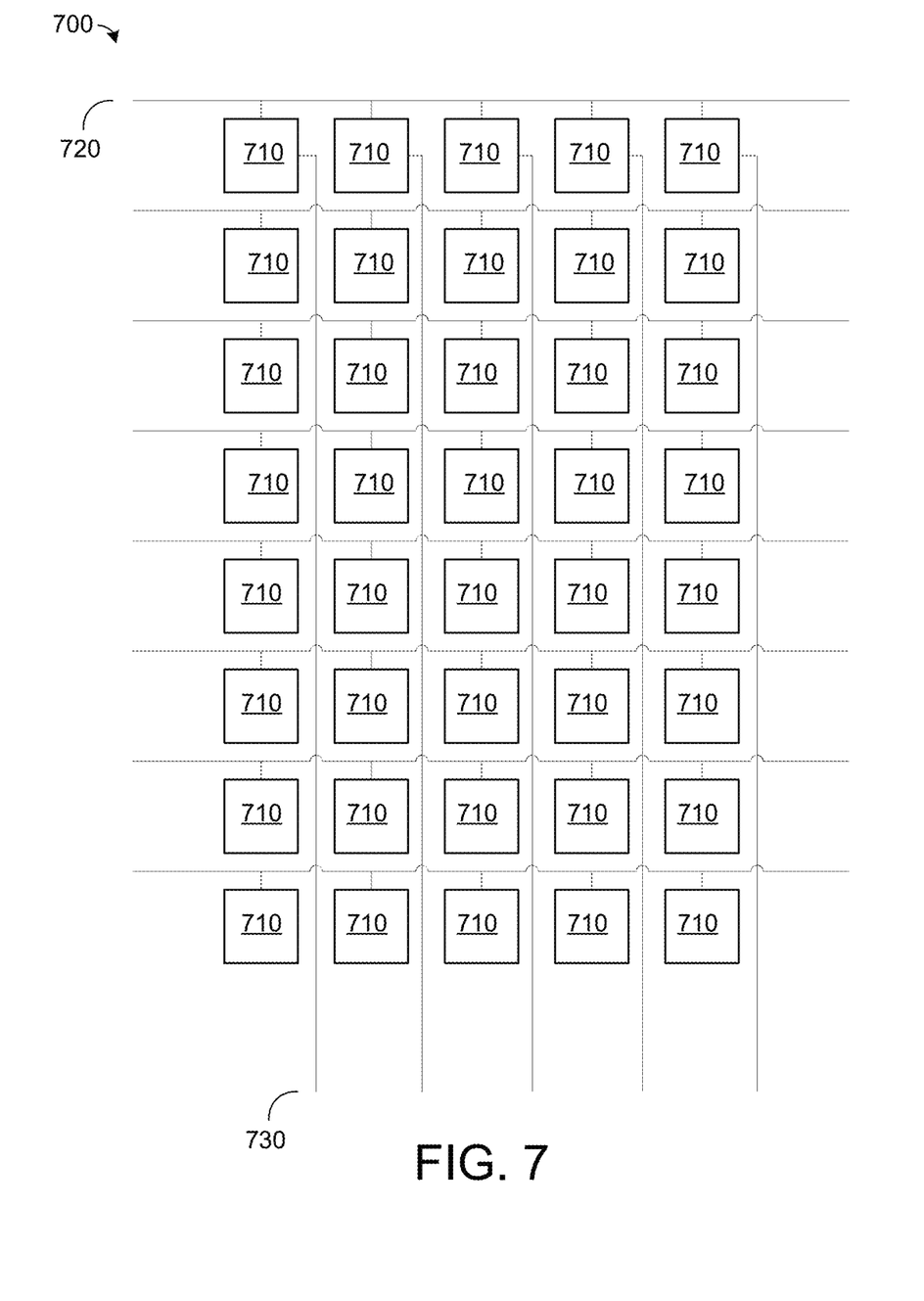
FIG. 7 depicts an exemplary embodiment of an array of electrically-tunable optical filters to form cells of a display.

FIG. 7 depicts an example embodiment of a display 700 having a plurality of tunable filters 710, such as is depicted by the embodiment of FIG. 1 or FIG. 10. Each tunable filter 710 forms a pixel of the overall display 700. In this regard, each filter 710 may be separated from an adjacent filter 710 by an insulator and may be individually controllable to provide a certain color value. In this regard, each filter 710 may filter broadband light (e.g., white light) to form one or more absorption peaks in the light so that a desired color is emitted from the filter 710. The transition time for each filter 710 may be quicker than that for pixels of a liquid crystal display (LCD).

Figure 11:
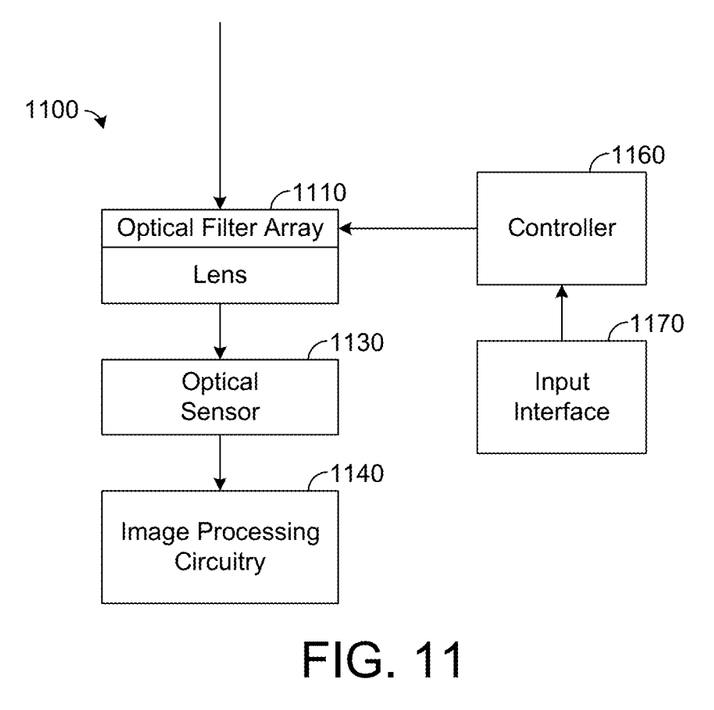
FIG. 11 is a block diagram illustrating an exemplary embodiment of a camera that uses an array of tunable optical filters, such as depicted by FIG. 1 or 10, to filter light from a scene.

FIG. 11 depicts an embodiment of a camera 1100 that uses an array of optical filters 1110, such as is depicted by FIG. 1 or FIG. 10, to filter light that is captured by the camera 1100. In the embodiment of FIG. 11, the array of optical filters 1110 is formed on a lens 1120, and the each optical filter 1110 is a translucent filter such that light from a scene passes through and is filtered by the array of optical filters 1110. Such light also passes through the lens 1120 and is detected by an optical sensor 1130, such as a charge-coupled device (CCD), that converts the light into digital data defining an image of the scene. Such digital data is further processed by image processing circuitry 1140 as may be desired, such as to perform image enhancements or to display the digital data.

As shown by FIG. 11, the array of optical filters 1110 is coupled to a controller 1160 that is configured to control the optical filters 1110, such as specifying how one or more filters 1110 is to filter light passing through it. As an example, a user may submit an input via an input interface 1170 specifying one or more colors to be removed from the light captured by the camera 1100. In response, the controller 1160 may control the array of optical filters 1110 such that each filter 1110 absorbs the wavelength or wavelengths of the color or colors to be removed from the light. In this regard, the controller 1160 may instruct one or more filters 1110 to tune one or more absorption peaks as described above to remove such colors. As described above for the controller 130 of FIG. 1, the controller 1160 of FIG. 11 may be implemented in any combination of hardware, software, and firmware, and may include one or more processors for implementing the functionality of the controller 1160. As an example, the controller 1160 may include at least one processor programmed with software for controlling the array of optical filters 1110 as described herein.

Note that various modifications and changes to the camera 1100 shown by FIG. 11 are possible. As an example, it is possible for the filters 1110 to be reflective rather than translucent. In such an embodiment, the filters 1110 may be placed in the optical path such that light passing through the lens 1120 is reflected by the filters 1110 before being received by the optical sensor 1130. Various other modifications and changes are possible.

Figure 12:
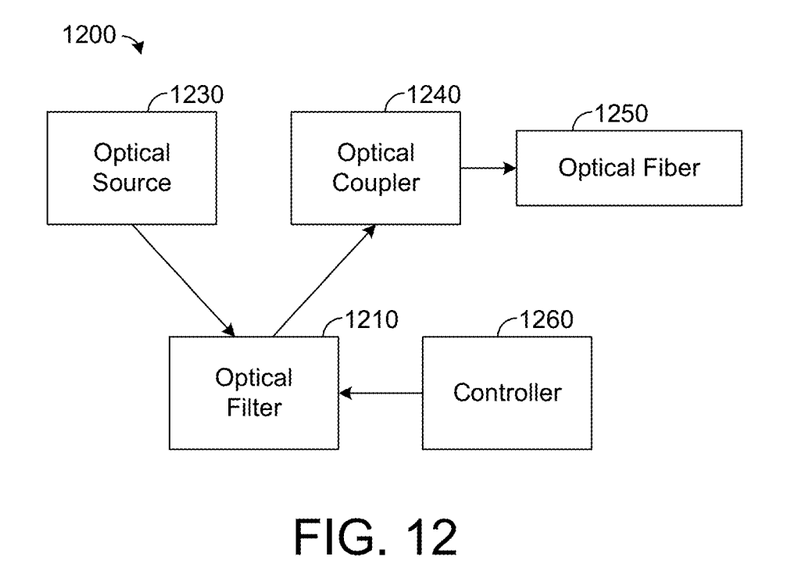
FIG. 12 is a block diagram illustrating an exemplary embodiment of an optical system using a tunable optical filter, such as depicted by FIG. 1 or 10, to perform various functions within the optical system, such as switching, multiplexing, and data modulation.

FIG. 12 depicts an optical system 1200 that uses a tunable optical filter 1210, such as is depicted by FIG. 1 or FIG. 10, in a telecommunication application or other type of application. In this regard, the optical filter 1210 is positioned to receive an optical signal, such as a data signal, from an optical source 1230, such as a laser, an optical fiber, an optical coupler, or other optical component that transmits optical signals. As described above, the optical filter 1210 is configured to reflect the optical signal and to absorb light at an absorption wavelength. The reflected optical signal may be received by an optical coupler 1240 that couples the signal into an optical fiber 1250. In other embodiments, the reflected optical signal may be received by other optical components.

A controller 1260 is configured to provide inputs for controlling the optical filter 1210. As an example, the controller 1260 may provide one or more inputs instructing the filter 1210 to tune its absorption peak or absorption peaks to one or more wavelengths, as may be desired. As described above for the controller 130 of FIG. 1, the controller 1260 of FIG. 12 may be implemented in any combination of hardware, software, and firmware, and may include one or more processors for implementing the functionality of the controller 1260. As an example, the controller 1260 may include at least one processor programmed with software for controlling the optical filter 1210 as described herein.

In some embodiments, the optical filter 1210 may be used to implement an optical switch. In this regard, to permit the optical signal from the source 1230 to pass to the coupler 1240 and optical fiber 1250 (or other optical component), the filter 1210 may tune its absorption wavelength sufficiently far from the wavelength of the optical signal so that the optical signal is reflected, not absorbed, by the filter 1210. However, if the optical signal is to be prevented from passing to the coupler 1240 and optical fiber 1250 (or other optical component), the filter 1210 may tune its absorption wavelength to the wavelength of the optical signal so that the optical signal is absorbed by the filter 1210.

In some cases, the optical filter 1210 may be used to implement a multiplexer. In this regard, multiple optical signal may be directed to the filter 1210, which may have stacked cavities, as shown by FIG. 10. The filter 1210 may select one of the signals to pass to the optical coupler 1240 and optical fiber 1250 (or other optical component) by tuning its absorption wavelengths to the wavelengths of the other signals not selected. Thus, each optical signal is absorbed by the filter 1210 except for the one signal permitted to pass. Notably, the filter 1210 may select a different signal to pass by adjusting the absorption wavelengths as appropriate to permit only the newly selected signal to reflect from the filter 1210. If desired, a translucent filter may be used to implement a switch or multiplexer in the same way described above except that the selected signal passes through the filter 1210 rather than reflecting from it.

In some embodiments, the system 1200 shown by FIG. 12 may be used to modulate an optical signal. In such an embodiment, the optical source 1230 may include a laser or other optical transmitter that transmits an unmodulated signal (e.g., a carrier signal) to the filter 1210. Further, the filter 1210 may receive from the controller 1260 or otherwise data to be modulated onto the carrier signal. Based on the data, the optical filter 1210 may tune its absorption wavelength to selectively coincide with the wavelength of the optical signal transmitted by the source 1230 in order to modulate such optical signal with the data. As an example, for a logical high value, the optical filter 1210 may tune its absorption wavelength sufficiently far from the wavelength of the optical signal so that the optical signal is reflected, not absorbed, by the filter 1210. However, for a logical low value, the optical filter 1201 may tune its absorption wavelength to the wavelength of the optical signal so that the optical signal is absorbed by the filter 1210. If desired, a translucent filter may be used to implement a modulator in the same way described above except that the optical signal, when not absorbed by the filter 1210, passes through the filter 1210 rather than reflecting from it. Other configurations and uses of the optical system 1200 would be apparent to a person of ordinary skill upon reading this disclosure.

Now, therefore, the following is claimed:

1. An electrically-tunable optical filter, comprising:
   a first conductive layer that is semi-transparent;
   a second conductive layer;
   a third layer formed between the first conductive layer and the second conductive layer;

a dielectric layer formed between the first conductive layer and the second conductive layer, wherein the first conductive layer, the second conductive layer, the third layer, and the dielectric layer form an optical cavity that is configured to receive light passing through the first conductive layer and absorb a portion of the light at an absorption wavelength to form an absorption peak in the light, and wherein the third layer has an electron carrier density between an electron carrier density of the dielectric layer and an electron carrier density of at least one of the first conductive layer and the second conductive layer; and a controller electrically coupled to the first conductive layer and the second conductive layer, the controller configured to apply a voltage to the first conductive layer and the second conductive layer such that an electric field induced by the voltage changes the electron carrier density of the third layer, thereby changing an index of refraction of the third layer and tuning the absorption peak.

2. An electrically-tunable optical filter, comprising:

a first conductive layer;

a second conductive layer;

a third layer formed between the first conductive layer and the second conductive layer;

a dielectric layer formed between the first conductive layer and the second conductive layer, wherein the first conductive layer, the second conductive layer, the third layer, and the dielectric layer form an optical cavity that is configured to absorb light passing through the optical cavity at an absorption wavelength, and wherein the third layer has an electron carrier density between an electron carrier density of the dielectric layer and an electron carrier density of at least one of the first conductive layer and the second conductive layer; and a controller electrically coupled to the first conductive layer and the second conductive layer, the controller configured to apply a voltage to the first conductive layer and the second conductive layer and to adjust the voltage for changing the electron carrier density of the third layer, thereby changing an index of refraction of the third layer and tuning the absorption wavelength.

3. The filter of claim 2, wherein the filter forms a pixel of a display.

4. The filter of claim 2, wherein the filter is positioned within an optical path of a camera.

5. The filter of claim 2, wherein the filter is positioned within a path of an optical data signal.

6. The filter of claim 2, wherein the controller is configured to adjust the voltage based on data such that an optical signal received by the filter is modulated with the data.

7. The filter of claim 2, wherein the first conductive layer is semi-transparent, and wherein the second conductive layer is opaque.

8. A filtering method, comprising:

receiving light into an optical cavity of an optical filter, the optical cavity having a first conductive layer, a second conductive layer, a third layer between the first conductive layer and the second conductive layer, and a dielectric layer between the first conductive layer and the second conductive layer, wherein the third layer has an electron carrier density between an electron carrier density of the dielectric layer and an electron carrier density of at least one of the first conductive layer and the second conductive layer;

absorbing a portion of the light at an absorption wavelength within the optical cavity;

generating an electric field that passes through the optical cavity; and tuning the absorption wavelength, wherein the tuning comprise adjusting the electric field to change the electron carrier density of the third layer, thereby changing an index of refraction of the third layer.

9. The method of claim 8, wherein the first conductive layer and the second conductive layer are electrically coupled to a controller, and wherein the adjusting the electric field comprises adjusting a voltage applied to the first conductive layer and the second conductive layer by the controller.

10. The method of claim 8, wherein the first conductive layer is semi-transparent, and wherein the second conductive layer is opaque.

* * * * *